(12) United States Patent
Li et al.

(10) Patent No.: US 12,490,237 B2
(45) Date of Patent: Dec. 2, 2025

(54) METHOD AND APPARATUS OF INFORMATION INDICATION FOR PAGING MESSAGE, TERMINAL DEVICE AND NETWORK DEVICE

(71) Applicant: GUANGDONG OPPO MOBILE TELECOMMUNICATIONS CORP., LTD., Dongguan (CN)

(72) Inventors: Haitao Li, Dongguan (CN); Yi Hu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 377 days.

(21) Appl. No.: 18/091,287

(22) Filed: Dec. 29, 2022

(65) Prior Publication Data

US 2023/0199714 A1    Jun. 22, 2023

Related U.S. Application Data

(63) Continuation of application No. PCT/CN2020/104956, filed on Jul. 27, 2020.

(51) Int. Cl.
*H04W 68/02* (2009.01)
*H04W 52/02* (2009.01)

(52) U.S. Cl.
CPC ................ *H04W 68/02* (2013.01)

(58) Field of Classification Search
CPC .......................................... H04W 68/02
USPC ...................................... 455/458
See application file for complete search history.

(56) References Cited

U.S. PATENT DOCUMENTS

| 2019/0254110 | A1* | 8/2019 | He ............... H04L 41/0896 |
| 2021/0337507 | A1* | 10/2021 | Selvaganapathy .... H04W 68/02 |
| 2022/0322156 | A1* | 10/2022 | Kim ............... H04W 76/28 |
| 2022/0394617 | A1* | 12/2022 | Li ............... H04W 52/0235 |

(Continued)

FOREIGN PATENT DOCUMENTS

| CN | 109426525 A | 3/2019 |
| CN | 109644426 A | 4/2019 |

(Continued)

OTHER PUBLICATIONS

English machine translation of Kuandong CN110831125 (Year: 2020).*

(Continued)

*Primary Examiner* — Mark G. Pannell
(74) *Attorney, Agent, or Firm* — BAYES PLLC

(57) ABSTRACT

The embodiments of the present application provide an information indication method and apparatus, a terminal device and a network device. The method comprises: the terminal device receiving a first signal, the first signal being associated with a first paging time unit set and carrying first indication information, which is used for indicating whether part or all paging time units in the first paging time unit set contain a paging message; and according to the first indication information, the terminal device carrying out paging message monitoring in one or more target paging time units containing a paging message in the first paging time unit set, the target paging time units corresponding to the terminal device.

13 Claims, 6 Drawing Sheets

A terminal device receives a first signal associated with a first paging time unit set, where the first signal carries first indication information, and the first indication information is used to indicate whether part or all of paging time units in the first paging time unit set include a paging message — 201

The terminal device monitors for the paging message in one or more target paging time units corresponding to the terminal device and including the paging message in the first paging time unit set, according to the first indication information — 202

(56) References Cited

U.S. PATENT DOCUMENTS

| | | | | |
|---|---|---|---|---|
| 2023/0092687 A1* | 3/2023 | Berggren | .......... | H04W 52/0229 370/329 |
| 2023/0108646 A1* | 4/2023 | Tseng | .................. | H04W 68/025 455/458 |
| 2023/0164732 A1* | 5/2023 | Lee | .................. | H04W 52/0229 455/456.1 |
| 2023/0209464 A1* | 6/2023 | Tsai | .................. | H04W 52/0216 370/311 |

FOREIGN PATENT DOCUMENTS

| | | |
|---|---|---|
| CN | 110351761 A | 10/2019 |
| CN | 110831125 A | 2/2020 |
| WO | 2018174635 A1 | 9/2018 |
| WO | 2019096035 A1 | 5/2019 |
| WO | 2020032532 A1 | 2/2020 |
| WO | 2020060696 A1 | 3/2020 |

OTHER PUBLICATIONS

First Office Action issued in corresponding European application No. 20947201.8, mailed Jun. 18, 2024.
Priority Review issued in corresponding Chinese application No. 202310396589.0, mailed Jun. 27, 2024.
First Office Action issued in corresponding Chinese application No. 202310396589.0, mailed Jun. 28, 2024.
Summons to attend oral proceedings pursuant to Rule 115(1) EPC issued in corresponding European Application No. 20947201.8, mailed on Jan. 31, 2025, 5 pages.
Decision of Rejection issued in corresponding Chinese Application No. 202310396589.0, mailed Jan. 10, 2025, 10 pages.
Second Office Action issued in corresponding Chinese Application No. 202310396589.0, dated Sep. 11, 2024, 12 pages.
Ericsson, "Cross-slot scheduling for UE power saving in paging", R1-1907328, 3GPP TSG RAN WG1 Meeting #97 Reno, USA, May 13-17, 2019.
International Search Report issued in International application No. PCT/CN2020/104956, mailed Apr. 25, 2021.
Written Opinion of the International Searching Authority issued in International application No. PCT/CN2020/104956, mailed Apr. 25, 2021.
MediaTek Inc., "New WID: Rel-17 UE Power Saving Enhancements", RP-193173, 3GPP TSG RAN Meeting #86 Sitges, Spain, Dec. 9-12, 2019.
Extended European Search Report issued in corresponding European application No. 20947201.8, mailed Sep. 8, 2023.
3GPP TS 36.304 V15.0.0 (Jun. 2018); Evolved Universal Terrestrial Radio Access (E-UTRA); User Equipment (UE) procedures in idle mode (Release 15).

* cited by examiner

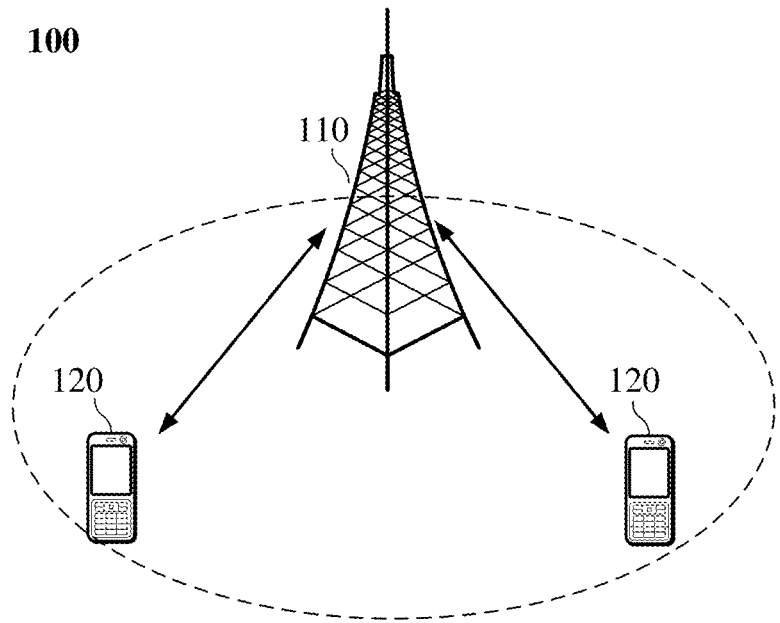

FIG. 1

| A terminal device receives a first signal associated with a first paging time unit set, where the first signal carries first indication information, and the first indication information is used to indicate whether part or all of paging time units in the first paging time unit set include a paging message | 201 |

| The terminal device monitors for the paging message in one or more target paging time units corresponding to the terminal device and including the paging message in the first paging time unit set, according to the first indication information | 202 |

FIG. 2

METHOD AND APPARATUS OF INFORMATION INDICATION FOR PAGING MESSAGE, TERMINAL DEVICE AND NETWORK DEVICE

CROSS-REFERENCE

This application is a continuation application of PCT Patent Application No. PCT/CN2020/104956, entitled "INFORMATION INDICATION METHOD AND APPARATUS, TERMINAL DEVICE AND NETWORK DEVICE", filed on Jul. 27, 2020, the disclosure of which is incorporated herein by reference in its entirety.

TECHNICAL FIELD

The embodiments of the present disclosure relate to the technical field of mobile communications, and in particular to an information indication method and apparatus, a terminal device, and a network device.

BACKGROUND

In 3rd Generation Partnership Project (3GPP) standard discussion, for power saving, it is proposed to send a Paging Early Indication (PEI) signal or a Wake Up Signal (WUS) before a Paging Occasion (PO) to reduce monitoring of the POs by the terminal device. However, how the PEI signal or WUS indicates paging is not yet clear.

SUMMARY

Embodiments of the present disclosure provide an information indication method and apparatus, a terminal device, and a network device.

An information indication method provided in the embodiments of the present disclosure includes:
  receiving, by a terminal device, a first signal associated with a first paging time unit set, wherein the first signal carries first indication information, and the first indication information is used to indicate whether part or all of paging time units in the first paging time unit set include a paging message; and
  monitoring for the paging message by the terminal device in one or more target paging time units corresponding to the terminal device and including the paging message in the first paging time unit set, according to the first indication information.

An information indication method provided in the embodiments of the present disclosure includes:
  transmitting, by a network device, a first signal associated with a first paging time unit set to a terminal device, wherein the first signal carries first indication information, and the first indication information is used to indicate whether part or all of paging time units in the first paging time unit set include a paging message,
  wherein the first indication information is used for the terminal device to determine one or more target paging time units corresponding to the terminal device and including the paging message in the first paging time unit set.

An information indication apparatus provided in the embodiments of the present disclosure is applied to a terminal device, and the apparatus includes:
  a receiving unit, configured to receive a first signal associated with a first paging time unit set, wherein the first signal carries first indication information, and the first indication information is used to indicate whether part or all of paging time units in the first paging time unit set include a paging message; and
  a monitoring unit configured to monitor for the paging message in one or more target paging time units corresponding to the terminal device and including the paging message in the first paging time unit set, according to the first indication information.

An information indication apparatus provided in the embodiments of the present disclosure is applied to a network device, and the apparatus includes:
  a transmitting unit configured to transmit a first signal associated with a first paging time unit set to a terminal device, wherein the first signal carries first indication information, and the first indication information is used to indicate whether part or all of paging time units in the first paging time unit set include a paging message,
  wherein the first indication information is used for the terminal device to determine one or more target paging time units corresponding to the terminal device and including the paging message in the first paging time unit set.

A terminal device provided by in the embodiments of the present disclosure includes a processor and a memory. The memory is configured to store a computer program, and the processor is configured to call and run the computer program stored in the memory to perform the information indication method as described above.

A network device provided by in the embodiments of the present disclosure includes a processor and a memory. The memory is configured to store a computer program, and the processor is configured to call and run the computer program stored in the memory to perform the information indication method as described above.

A chip provided in the embodiments of the present disclosure is configured to implement the above-mentioned information indication method.

Specifically, the chip includes: a processor, configured to call and run a computer program from a memory to cause a device installed with the chip to perform the information indication method as described above.

A computer-readable storage medium provided in the embodiments of the present disclosure is used to store a computer program that enables a computer to perform the information indication method as described above.

A computer program product provided in the embodiments of the present disclosure includes computer program instructions that cause a computer to perform the information indication method as described above.

A computer program provided in the embodiments of the present disclosure, when running on a computer, causes the computer to perform the information indication method as described above.

In the technical solutions of the embodiments of the present disclosure, the first signal is associated with the first paging time unit set, and the first indication information in the first signal indicates whether some or all of the paging time units in the first paging time unit set include the paging message, so that the terminal device can determine which paging time units contain the paging message, and the terminal device can perform paging message monitoring only in one or more target paging time units corresponding to the terminal device that contain the paging message, achieving the purpose of power saving.

BRIEF DESCRIPTION OF THE DRAWINGS

The drawings described here are used to provide a further understanding of the present disclosure and constitute a part of the present disclosure. The exemplary embodiments of the present disclosure and description thereof are used to explain the present disclosure, and do not constitute an improper limitation on the present disclosure. In the drawings, FIG. 1 is a schematic diagram of an architecture of a communication system provided by an embodiment of the present disclosure;

FIG. 2 is a schematic flowchart of an information indication method provided by an embodiment of the present disclosure;

DETAILED DESCRIPTION

Figure 3:
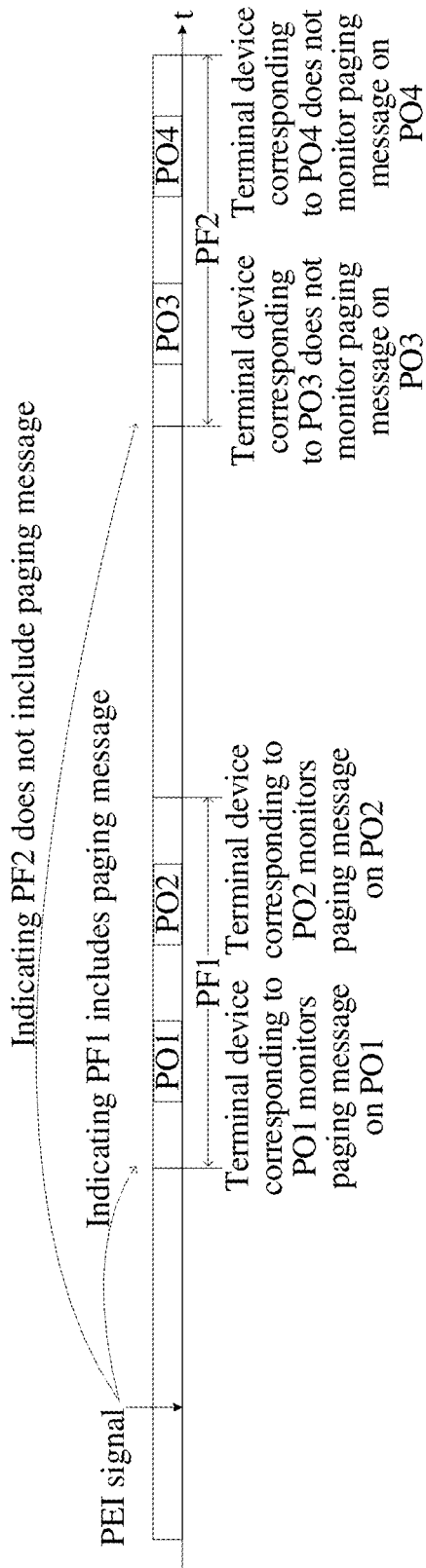
FIG. 3 is a schematic diagram of a first application example provided by an embodiment of the present disclosure.

The technical solutions in the embodiments of the present disclosure will be described below in connection with the drawings in the embodiments of the present disclosure. Obviously, the embodiments described are part of the embodiments of the present disclosure, but not all the embodiments. All other embodiments obtained by those of ordinary skill in the art based on the embodiments in the present disclosure without creative work fall within the protection scope of the present disclosure.

The technical solutions of the embodiments of the present disclosure can be applied to various communication systems, such as a Long Term Evolution (LTE) system, a LTE Frequency Division Duplex (FDD) system, a LTE Time Division Duplex (TDD) system, a 5G communication systems, a future communication system or the like.

Exemplarily, a communication system 100 in which the embodiments of the present disclosure are applied is as shown in FIG. 1. The communication system 100 may include a network device 110 which can be a device that communicates with terminals 120 (or called communication terminals or terminals). The network device 110 can provide communication coverage for a specific geographic area, and can communicate with terminals located in the coverage area. Optionally, the network device 110 can be an Evolutional Node B (eNB or eNodeB) in an LTE system, or a radio controller in a Cloud Radio Access Network (CRAN), or the network device can be a mobile switching center, a relay station, an access point, an in-vehicle device, a wearable device, a hub, a switch, a bridge, a router, a network side device in a 5G network, a network device in a future communication system, or the like.

The communication system 100 also includes at least one terminal 120 located within the coverage range of the network device 110. As used herein, the terminal includes, but is not limited to, a device configured to receive/send communication signals and/or an Internet of Things (IoT) device, which may be connected via wired lines, such as Public Switched Telephone Networks (PSTN), Digital Subscriber Line (DSL), digital cables, and direct cable connections; and/or via another data connection/network; and/or via a wireless interface, such as cellular networks, wireless local area networks (WLAN), digital TV networks such as DVB-H networks, satellite networks, AM-FM broadcast transmitters; and/or another terminal. A terminal configured to communicate through a wireless interface may be referred to as a "wireless communication terminal", a "wireless terminal" or a "mobile terminal". Examples of the mobile terminal include but are not limited to a satellite or cellular phone; a Personal Communications System (PCS) terminal that can combine a cellular radio phone with data processing, fax, and data communication capabilities; a PDA that may include a radio phone, a pager, Internet/intranet access, a Web browser, a memo pad, a calendar, and/or a Global Positioning System (GPS) receiver; and conventional laptop and/or palmtop receivers or other electronic devices including a radio telephone transceiver. The terminal device may refer to an access terminal, user equipment (UE), a user unit, a user station, a mobile station, a mobile console, a remote station, a remote terminal, a mobile device, a user terminal, a terminal, a wireless communication device, a user agent, or a user device. The access terminal may be a cellular phone, a cordless phone, a Session Initiation Protocol (SIP) phone, a wireless local loop (WLL) station, a personal digital assistant (PDA), a wireless communication functional handheld device, a computing device or other processing devices connected to a wireless modem, a in-vehicle device, a wearable device, a terminal in 5G network, a terminal in the future evolution of PLMN, or the like.

Optionally, Device to Device (D2D) communication may be performed between the terminals 120.

Optionally, the 5G system or 5G network may also be referred to as a New Radio (NR) system or NR network.

FIG. 1 exemplarily shows one network device and two terminals. Optionally, the communication system 100 may include multiple network devices and other number of terminals can be included in the coverage of each network device, which is not particularly limited in the embodiments of the present disclosure.

Optionally, the communication system 100 may also include other network entities such as a network controller and a mobility management entity, which are not limited in the embodiments of the present disclosure.

It should be understood that the device with a communication function in the network and/or system of the embodiments of the present disclosure may be referred to as the communication device. Taking the communication system 100 shown in FIG. 1 as an example, the communication device may include a network device 110 and terminals 120 which have the communication function. The network device 110 and the terminals 120 may be the specific devices as described above, which will not be repeated here. The communication device may also include other devices in the communication system 100, such as a network controller, a mobility management entity, and other network entities, which are not limited in the embodiments of the present disclosure.

It should be understood that the terms "system" and "network" are often used interchangeably herein. The term "and/or" used herein is merely to describe relative relationships of relative objects, indicating that there can be three kinds of relationships. For example, A and/or B can indicate three cases where A exists alone, A and B exist simultaneously, or B exists alone. In addition, the character "/" used herein generally indicates that the related objects before and after this character are in an "or" relationship.

In order to facilitate understanding of the technical solutions of the embodiments of the present disclosure, related technologies involved in the embodiments of the present disclosure are described below.

The main function of paging is to enable the network to page the terminal device through a paging message when the terminal device is in a Radio Resource Control (RRC) idle state or RRC inactive state; or the network device can notify the terminal device of system message changes or earthquake and tsunami information or public warning information through a short message, which applies to the terminal device in any RRC state, such as an RRC idle state, an RRC inactive state, or an RRC connected state.

The physical channels involved in paging (referred to as paging channels) include a Physical Downlink Control Channel (PDCCH) scrambled with a Paging Radio Network Temporary Identifier (P-RNTI), and a Physical Downlink Share Channel (PDSCH) scheduled by the PDCCH. The paging message is transmitted in the PDSCH, and the short message occupies 8 bits and is transmitted in the PDCCH.

For a terminal device in the RRC idle state or RRC inactive state, since there is no data communication between the terminal device and the network, in order to save power for the terminal device, the terminal device can discontinuously monitor the paging channels, that is, adopting Paging Discontinuous Reception (Paging DRX) mechanism. Under the Paging DRX mechanism, the terminal device only needs to monitor for paging scheduling information on one PO in each Paging DRX cycle. For the convenience of description, in the following embodiments, the paging scheduling information monitored on the PO is also referred to as a paging message. PO is a series of PDCCH monitoring occasions, and can be composed of multiple slots. In addition, a Paging Frame (PF) refers to a radio frame (with a fixed length of 10 ms) which may contain multiple POs or starting positions of multiple POs.

The period of the Paging DRX cycle (referred to as the DRX cycle) is determined jointly by a common cycle configured in system broadcast and a dedicated cycle configured in higher layer signaling (i.e., NAS signaling), and the terminal device takes a minimum of the two cycles as the Paging DRX cycle. From a network point of view, one Paging DRX cycle can include multiple POs, and the location where a terminal device needs to monitor the PO is related to the terminal device's identifier (i.e., UE_ID). Specifically, a PF and PO corresponding to a terminal device in a Paging DRX cycle can be determined from the following formulas.

A System Frame Number (SFN) of the PF corresponding to the terminal device is determined by the following formula:

$$(SFN+PF\_offset) \bmod T = (T \operatorname{div} N)*(UE\_ID \bmod N).$$

An index (i_s) of the PO corresponding to the terminal device in a PF is determined by the following formula:

$$i\_s = \operatorname{floor}(UE\_ID/N) \bmod Ns.$$

The parameters in the above formulas are explained as follows.

T: a DRX cycle for the terminal device to receive the paging message. The network will broadcast a default DRX cycle. If the higher layer (that is, the RRC layer) configures a dedicated DRX cycle for the terminal device, the minimum between the DRX cycle broadcast by the network and the dedicated DRX cycle configured by the higher layer is used as the DRX cycle of the terminal device. If the higher layer does not configure a DRX cycle dedicated to the terminal device for the terminal device, the DRX cycle broadcast by the network is used as the DRX cycle of the terminal device.

N: the number of PFs included in one DRX cycle.

Ns: the number of POs included in one PR

PF_offset: used to determine a time-domain offset of the PF.

UE_ID: 5G-S-TMSI mod 1024, where 5G-S-TMSI is the 5G short TMSI of the terminal device.

3GPP proposes a project to further enhance the energy saving of terminal device, and one of the goals of this project is to reduce unnecessary paging reception of terminal device by designing an enhanced paging mechanism.

Reception of the POs includes blind detection of PDCCH and corresponding PDSCH. At the same time, for a terminal device in a non-connected state (that is, RRC idle state or RRC inactive state), the terminal device also needs to perform a synchronization operation before blindly detecting the PDCCH. For a terminal device with better channel quality, fewer SSB bursts may be required to complete the synchronization, but for the terminal device with poor channel quality, more SS bursts may be required to complete the synchronization.

In the 3GPP standard discussion, it is proposed to send a PEI signal or WUS before a PO to reduce monitoring of the PO by the terminal device for energy saving. One solution is to send the PEI signal or WUS at timing positions which are close to the SS burst, and receive the PEI signal or WUS through synchronization of the SS burst. But how the network indicates the paging through the PEI signal or WUS is not yet clear. To this end, the following technical solutions of the embodiments of the present disclosure are proposed.

FIG. 2 is a schematic flow chart of an information indication method provided by an embodiment of the present disclosure. As shown in FIG. 2, the information indication method includes the following steps.

In step 201, a terminal device receives a first signal associated with a first paging time unit set, where the first signal carries first indication information, and the first indication information is used to indicate whether part or all of paging time units in the first paging time unit set include a paging message.

In an embodiment of the present disclosure, the network device sends a first signal to the terminal device; and correspondingly, the terminal device receives the first signal sent by the network device, and the first signal is associated with a first paging time unit set; where the first signal carries first indication information, and the first indication information is used to indicate whether part or all of paging time units in the first paging time unit set include a paging message. Here, the first indication information is used by the terminal device to determine one or more target paging time units corresponding to the terminal device in the first paging time unit set, that contain the paging message. In an optional implementation, the network device is a base station, such as a gNB.

In an optional implementation, the first signal is a PEI signal or a WUS. It should be noted that most of the following examples are described by taking the PEI signal as an example of the first signal, and the WUS is also applicable to the technical solutions of the embodiments of the present disclosure.

In an embodiment of the present disclosure, the paging time unit is a PF or a PO.

In an example, taking the PEI signal as an example of the first signal, the terminal device receives the PEI signal, and the PEI signal is associated with a first PF set. The PEI signal carries first indication information, and the first indication information is used for indicating whether some or all of the PFs in the first PF set contain a paging message. Here, the determination that a PF contains the paging message is as follows: if at least one PO among all POs in the PF contains the paging message, it is determined that the PF contains the paging message.

In an example, taking the PEI signal as an example of the first signal, the terminal device receives the PEI signal, and the PEI signal is associated with a first PO set. The PEI signal carries first indication information, and the first indication information is used for indicating whether some or all of the POs in the first PO set contain a paging message.

In an embodiment of the present disclosure, the first paging time unit set is a set of cell-level paging time units, that is, a plurality of paging time units included in the first paging time unit set include one or more paging time units corresponding to each terminal device of at least one terminal device.

In step 202, the terminal device monitors for the paging message in one or more target paging time units corresponding to the terminal device and including the paging message in the first paging time unit set, according to the first indication information.

In an embodiment of the present disclosure, the one or more target paging time units corresponding to the terminal device and including the paging message may be determined in any of the following manners.

Manner 1: the terminal device determines a second paging time unit set corresponding to the terminal device in the first paging time unit set; and the terminal device determines, according to the first indication information, one or more target paging time units including the paging message in the second paging time unit set.

For example, the first paging time unit set includes paging time unit 1, paging time unit 2, paging time unit 3, and paging time unit 4, and the second paging time unit set corresponding to the terminal device includes paging time unit 2 and paging time unit 4. The first indication information indicates that paging time unit 1 and paging time unit 2 in the first paging time unit set contain the paging message. The terminal device determines, according to the first indication information, that the target paging time unit containing the paging message in the second paging time unit set is paging time unit 2.

Manner 2: the terminal device determines, according to the first indication information, a third paging time unit set that includes a paging message in the first paging time unit set; and the terminal device determines one or more target paging time units corresponding to the terminal device in the third time unit set.

For example, the first paging time unit set includes paging time unit 1, paging time unit 2, paging time unit 3, and paging time unit 4, and the first indication information indicates that paging time unit 1 and paging time unit 2 in the first paging time unit set contain paging messages. The terminal device determines, according to the first indication information, that the third paging time unit set including the paging message in the first paging time unit set includes paging time unit 1 and paging time unit 2. The terminal device determines that the target paging time unit corresponding thereto in the third paging time unit set is paging time unit 2.

In an embodiment of the present disclosure, when the paging time unit is a PF or a PO, the first indication information may be implemented in the following manner.

The first indication information includes a first bit map, each bit in the first bit map has correspondence with each paging time unit in the first paging time unit set, and a value of the bit is used to indicate whether a paging time unit corresponding to this bit contains a paging message.

For example, the first paging time unit set includes a number of M1 paging time units, a bit length of the first bit map is M1 (that is, the first bit map includes M1 bits), the M1 bits in the first bit map correspond to the M1 paging time units on a one-to-one basis, and the value of each bit is used to indicate whether the paging time unit corresponding to the bit contains a paging message. For example, a bit value of 1 indicates that the paging time unit corresponding to the bit contains a paging message, and a bit value of 0 indicates that the paging time unit corresponding to the bit does not contain a paging message.

In an embodiment of the present disclosure, when the paging time unit is a PF, the first indication information may be implemented in the following manner.

The first indication information includes a first SFN list and/or a second SFN list, where a paging time unit indicated by a SFN in the first SFN list is a paging time unit that contains a paging message, and a paging time unit indicated by a SFN in the second SFN list is a paging time unit that does not contain a paging message.

Here, each PF is a radio frame, and has a corresponding SFN. For example, a SFN of PF1 is SFN1, and a SFN of PF2 is SFN2. The first SFN list is used to determine a list of PFs that contain the paging message. The second SFN list is used to determine a list of PFs that do not contain the paging message.

In an embodiment of the present disclosure, when the paging time unit is a PF, the first indication information is used to indicate whether some or all of the PFs in a first PF set contain the paging message; and further, optionally, the first signal further carries second indication information, and the second indication information is used to indicate whether some or all of POs in a first PO set contain the paging message, where the first PO set refers to a set of POs included in the PF that contains the paging message.

On this basis, the terminal device monitors for the paging message in one or more target POs corresponding to the terminal device and including the paging message in the first PO set, according to the second indication information.

In an embodiment of the present disclosure, the one or more target POs corresponding to the terminal device and including the paging message may be determined in any of the following manners.

Manner A: the terminal device determines a second PO set corresponding to the terminal device in the first PO set; and the terminal device determines, according to the second indication information, one or more target POs containing the paging message in the second PO set.

For example, the first PO set includes PO1, PO2, PO3, and PO4, and the second PO set corresponding to the terminal device includes PO2 and PO4. The second indication information indicates that PO1 and PO2 in the first PO set contain paging messages. The terminal device determines, according to the second indication information, that the target PO containing the paging message in the second PO set is PO2.

Manner B: the terminal device determines a third PO set containing the paging message in the first PO set according to the second indication information; and the terminal device determines one or more target POs corresponding to the terminal device in the third PO set.

For example, the first PO set includes PO1, PO2, PO3, and PO4, and the second indication information indicates that PO1 and PO2 in the first PO set contain paging messages, and the terminal device determines according to the second indication information that the third PO set containing the paging messages in the first PO set includes PO1 and PO2. The terminal device determines that the target PO corresponding thereto in the third PO set is PO2.

In an embodiment of the present disclosure, the second indication information includes a second bit map, each bit in the second bit map has correspondence with each PO in the first PO set, and a value of the bit is used to indicate whether a PO corresponding to this bit contains a paging message.

For example, for a certain PF containing the paging message, the first PO set included therein includes a number of Ns POs, the bit length of the second bit map is Ns (that is, the second bit map includes Ns bits), the Ns bits in the second bit map correspond to the Ns POs on a one-to-one basis, and a value of each bit is used to indicate whether a PO corresponding to the bit contains a paging message. For example, a bit value of 1 indicates that the PO corresponding to the bit contains a paging message, and a bit value of 0 indicates that the PO corresponding to the bit does not contain a paging message.

In an embodiment of the present disclosure, the terminal device refers to a terminal device in a non-connected state, for example, a terminal device in an RRC idle state or an RRC inactive state. The terminal device in the RRC idle state or RRC inactive state receives the first signal (such as a PEI signal or a WUS) before monitoring for paging, and the first indication information carried by the first signal is used to indicate whether there is a PF/PO containing a paging message in a plurality of PFs/POs associated with the first signal. Here, the PF/PO means a PF or a PO. Further, in the case where the first signal is associated with a plurality of PFs, the first signal also carries second indication information, and the second indication information is used to indicate whether there is a PO containing a paging message in a plurality of POs included in a PF that contains the paging message.

In an embodiment of the present disclosure, the terminal device monitors for the paging message in one or more target paging time units corresponding to the terminal device and including the paging message, according to the first indication information. For example, the terminal device monitors for the paging message in one or more PFs corresponding to the terminal device and including the paging message. For example, the terminal device monitors for the paging message in one or more POs corresponding to the terminal device and including the paging message.

In an example, for a PF that does not contain a paging message, the terminal device does not monitor for the paging message in the PF. For a PF that contains the paging message, if the PF is not a PF corresponding to the terminal device, the terminal device does not monitor for the paging message in the PR For the PF that contains the paging message, if the PF is a PF corresponding to the terminal device, the terminal device monitors for the paging message in the PF.

In an example, for a PO that does not contain a paging message, the terminal device does not monitor for the paging message in the PO. For a PO that contains the paging message, if the PO is not a PO corresponding to the terminal device, the terminal device does not monitor for the paging message in the PO. For the PO that contains the paging message, if the PO is a PO corresponding to the terminal device, the terminal device monitors for the paging message in the PO.

In an example, for a PF that does not contain a paging message, the terminal device does not monitor for the paging message in the PF. For a PF that contains the paging message, if the PF is not a PF corresponding to the terminal device, the terminal device does not monitor for the paging message in the PR For the PF that contains the paging message, if the PF is a PF corresponding to the terminal device, a PO that contains the paging message and/or a PO that does not contain the paging message in the PF is further determined, and 1) for the PO that does not contain the paging message, the terminal device does not monitor for the paging message in the PO, and 2) for the PO that contains the paging message, if the PO is not the PO corresponding to the terminal device, the terminal device does not monitor for the paging message in the PO, and if the PO is the PO corresponding to the terminal device, the terminal device monitors for the paging message in the PO.

The technical solutions of the embodiments of the present disclosure are illustrated below in conjunction with specific application examples. It should be noted that the following application examples take the PEI signal as an example of the first signal, and when the first signal is the WUS, it is also applicable to the technical solutions of the embodiments of the present disclosure.

First Application Example

A PEI signal is associated with multiple PFs, the PEI signal carries first indication information, and the first indication information is used to indicate which PF or PFs in the multiple PFs contain a paging message. The terminal device receives the PEI signal, and determines according to the first indication information whether the PF corresponding to the terminal device contains the paging message, so as to determine whether to monitor the PO on the PF corresponding to the terminal device. Specifically, the technical solution of this application example can be realized through the following process.

1. Each PEI signal is associated with multiple PFs, for example, M1 PFs.

Here, the M1 PFs can be determined, for example, from a plurality of PFs included between two SS bursts.

2. The base station sends a PEI signal, where the PEI signal carries first indication information, and the first indication information is used to indicate which PF or PFs among the M1 PFs contain the paging message. Specifically, if at least one PO among the Ns POs in a certain PF contains the paging message, the base station indicates in the first indication information that the PF contains the paging message.

In specific:
a) the PF containing the paging message and/or the PF not containing the paging message among the M1 PFs may be indicated through the first bit map. Or,
b) the PF containing the paging message may be indicated through the first SFN list and/or the PF not containing the paging message may be indicated through the second SFN list.

3. The terminal device receives the PEI signal, and determines according to the first indication information whether the PF corresponding to the terminal device contains the paging message.

In specific:
a) the terminal device determines a PF set containing the paging message from the M1 PFs according to the first indication information, for example, a cell-level PF set 1;
b) the terminal device determines whether there is a PF corresponding to the terminal device in the cell-level PF set 1;
  1) if there is no PF corresponding to the terminal device in the cell-level PF set 1, the terminal device determines that there is no paging message in the PF that is associated with the PEI signal and corresponds to the terminal device, and thus the terminal device does not need to monitor the corresponding PF and PO;
  2) if the cell-level PF set 1 includes the PFs corresponding to the terminal device, the terminal device needs to perform paging monitoring on the PFs corresponding to the terminal device (that is, monitor the POs).

Referring to FIG. 3, the PEI signal is associated with PF1 and PF2, and the first indication information in the PEI signal is used to indicate that PF1 contains a paging message, and indicates that PF2 does not contain a paging message. PF1 includes PO1 and PO2, and PF2 includes PO3 and PO4. The terminal device corresponding to PO1 monitors for the paging message on PO1, the terminal device corresponding to PO2 monitors for the paging message on PO2, the terminal device corresponding to PO3 does not monitor for the paging message on PO2, and the terminal device corresponding to PO4 does not monitor for the paging message on PO4.

In the above technical solution, for multiple cell-level PFs associated with one PEI signal, the PEI signal carries first indication information, and the first indication information is used to indicate which PF or PFs contain the paging message. The terminal device receives the PEI signal, and determines according to the first indication information whether the PF corresponding to the terminal device contains the paging message, so as to decide whether to monitor the POs located on the PF corresponding to the terminal device.

Second Application Example

A PEI signal is associated with multiple POs, the PEI signal carries first indication information, and the first indication information is used to indicate which PO or POs in the multiple POs contain a paging message. The terminal device receives the PEI signal, and determines according to the first indication information whether the PO corresponding to the terminal device contains a paging message, so as to determine whether to monitor the PO corresponding to the terminal device. Specifically, the technical solution of this application example can be realized through the following process.

1. Each PEI is associated with multiple POs, for example, M2 POs.

Here, the M2 POs can be determined, for example, from a plurality of POs included between two SS bursts.

2. The base station sends a PEI signal, the PEI signal carries first indication information, and the first indication information is used to indicate which PO or POs among the M2 POs contain the paging message. Specifically, the first bit map may be used to indicate the PO containing the paging message and/or the PO not containing the paging message among the M2 POs.

3. The terminal device receives the PEI signal, and determines according to the first indication information whether the PO corresponding to the terminal device contains the paging message.

In specific:
a) the terminal device determines a PO set containing the paging message from the M2 POs according to the first indication information, for example, a cell-level PO set 1;
b) the terminal device determines whether there is a PO corresponding to the terminal device in the cell-level PO set 1;
  1) if there is no PO corresponding to the terminal device in the cell-level PO set 1, the terminal device determines that there is no paging message in the PO that is associated with the PEI signal and corresponds to the terminal device, and thus the terminal device does not need to monitor the corresponding PO;
  2) if the cell-level PO set 1 includes POs corresponding to the terminal device, the terminal device needs to perform paging monitoring on the POs corresponding to the terminal device.

Figure 4:
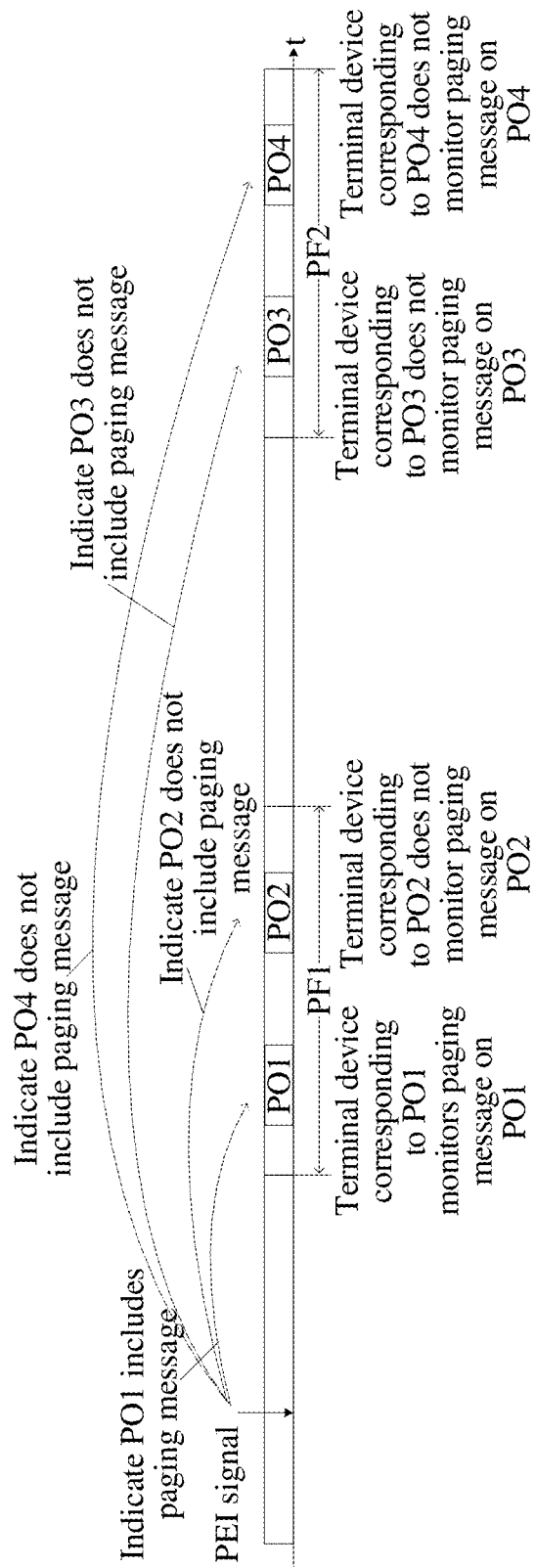
FIG. 4 is a schematic diagram of a second application example provided by an embodiment of the present disclosure.

Referring to FIG. 4, the PEI signal is associated with PO1, PO2, PO3, and PO4, and the first indication information in the PEI signal is used to indicate that PO1 includes a paging message, indicates that PO2 does not include a paging message, indicates that PO3 does not include a paging message, and indicates that PO4 does not include a paging message. The terminal device corresponding to PO1 monitors for the paging message on PO1, the terminal device corresponding to PO2 does not monitor for the paging message on PO2, the terminal device corresponding to PO3 does not monitor for the paging message on PO2, and the terminal device corresponding to PO4 does not monitor for the paging message on PO4.

In the above technical solution, for multiple cell-level POs associated with one PEI signal, the PEI signal carries first indication information, and the first indication information is used to indicate which PO or POs contain the paging message. The terminal device receives the PEI signal, determines according to the first indication information whether the POs corresponding to the terminal device contain the paging message, so as to decide whether to monitor the POs corresponding to the terminal device.

Third Application Example

A PEI signal is associated with multiple PFs, the PEI signal carries first indication information, and the first indication information is used to indicate which PF or PFs in the multiple PFs contain the paging message. The PEI signal also carries second indication information, and for the PF that contains the paging message, the second indication information is used to indicate which PO or POs in the PF contain the paging message. The terminal device receives the PEI signal, and determines whether the PF and PO corresponding to the terminal device contain the paging message according to the first indication information and the second indication information, so as to determine whether to monitor the corresponding PF and PO. Specifically, the technical solution of this application example can be realized through the following process.

1. Each PEI signal is associated with multiple PFs, for example, M1 PFs.

Here, the M1 PFs can be determined, for example, from a plurality of PFs included between two SS bursts.

2. The base station sends a PEI signal, the PEI signal carries first indication information, and the first indication information is used to indicate which PF or PFs among the M1 PFs contain the paging message. The PEI signal also carries second indication information, and the second indication information further indicates which PO or POs among Ns POs in the PF containing the paging message contain the paging message. For a PF that does not include a paging message, it does not need to further indicate the PO through the second indication information.

In specific:
a) the PF containing the paging message and/or the PF not containing the paging message among the M1 PFs can be indicated through the first bit map. Alternatively, the PF containing the paging message can be indicated through the first SFN list and/or the PF not containing the paging message can be indicated through the second SFN list.
b) which PO or POs among the Ns POs in the PF containing the paging message contain the paging message can be indicated through the second bit map.

3. The terminal device receives the PEI signal, and determines according to the first indication information and the second indication information whether the PF and PO corresponding to the terminal device contain the paging message.

In specific:
a) the terminal device determines a PF set containing the paging message from the M1 PFs according to the first indication information, for example, a cell-level PF set 1;
b) the terminal device determines whether there is a PF corresponding to the terminal device in the cell-level PF set 1;
  1) if there is no PF corresponding to the terminal device in the cell-level PF set 1, the terminal device determines that there is no paging message in the PF that is associated with the PEI signal and corresponds to the terminal device, and thus the terminal device does not need to monitor the corresponding PF and PO;
  2) if the cell-level PF set 1 includes PFs corresponding to the terminal device, for example, a UE-level PF set 2, the terminal device further obtains a cell-level PO set containing the paging message in the UE-level PF set 2 through the second indication information, such as a cell-level PO set 2. The terminal device determines whether there is a PO corresponding to the terminal device in the cell-level PO set 2:
    i) if there is no PO corresponding to the terminal device in the cell-level PO set 2, the terminal device does not need to perform paging monitoring on these PFs and POs;
    ii) if the cell-level PO set 2 includes POs corresponding to the terminal device, the terminal device performs paging monitoring on these POs.

Figure 5:
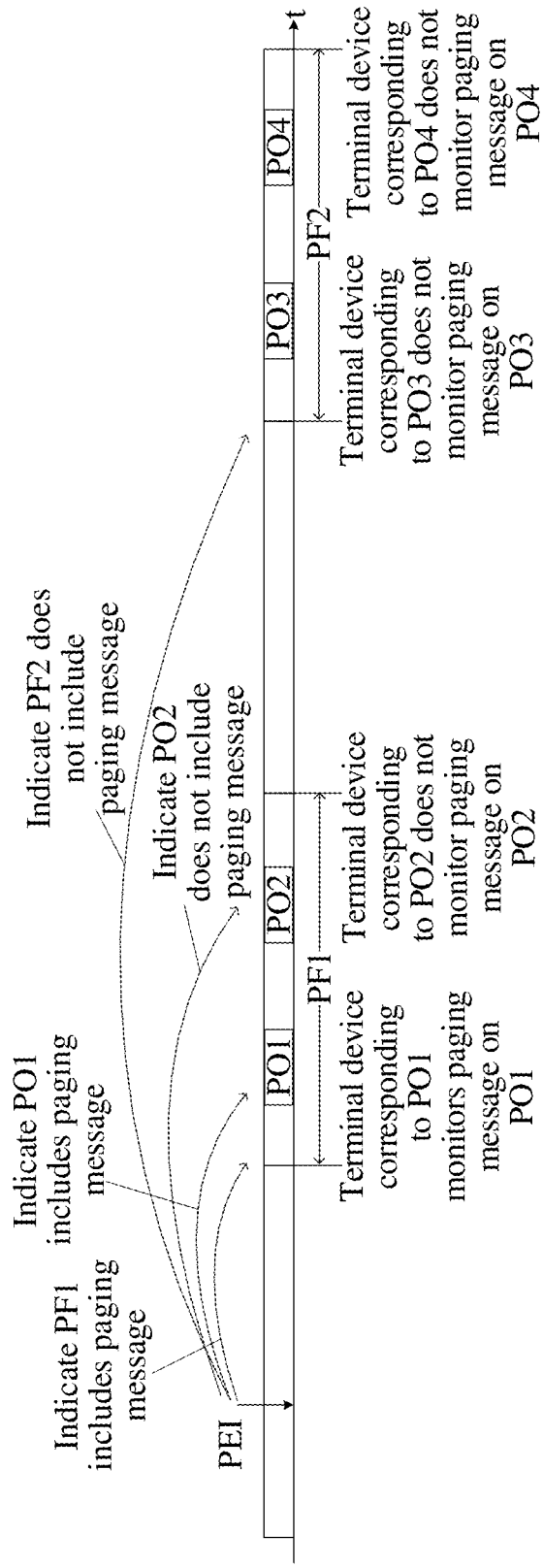
FIG. 5 is a schematic diagram of a third application example provided by an embodiment of the present disclosure.

Referring to FIG. 5, the PEI signal is associated with PF1 and PF2, and the first indication information in the PEI signal is used to indicate that PF1 contains a paging message, and indicates that PF2 does not contain a paging message. PF1 includes PO1 and PO2, and PF2 includes PO3 and PO4. For PF1 that contains the paging message, the second indication information in the PEI signal further indicates that PO1 contains the paging message, and indicates that PO2 does not contain the paging message. The terminal device corresponding to PO1 monitors for the paging message on PO1, the terminal device corresponding to PO2 does not monitor for the paging message on PO2, the terminal device corresponding to PO3 does not monitor for the paging message on PO2, and the terminal device corresponding to PO4 does not monitor for the paging message on PO4.

In the above technical solution, for multiple cell-level PFs associated with one PEI signal, the PEI signal carries first indication information, and the first indication information is used to indicate which PF or PFs contain the paging message. For the PF that contains the paging message, the PEI signal further indicates which PO or POs in the PF contain the paging message through the second indication information. The terminal device receives the PEI signal, and determines whether the PF and PO corresponding to the terminal device contain the paging message according to the first indication information and the second indication information, so as to determine whether to monitor the PF and PO corresponding to the terminal device.

The technical solutions of the embodiments of the present disclosure introduce a scenario where one PEI signal is associated with multiple PFs/POs, and by indicating in the PEI signal whether the PFs and/or POs contain a paging message, the base station can notify the terminal device on which PFs and/or POs to perform paging monitoring, that is, the terminal device performs monitoring only on several PFs/POs according to the indication information in the PEI signal, thereby achieving the purpose of saving power.

Figure 6:
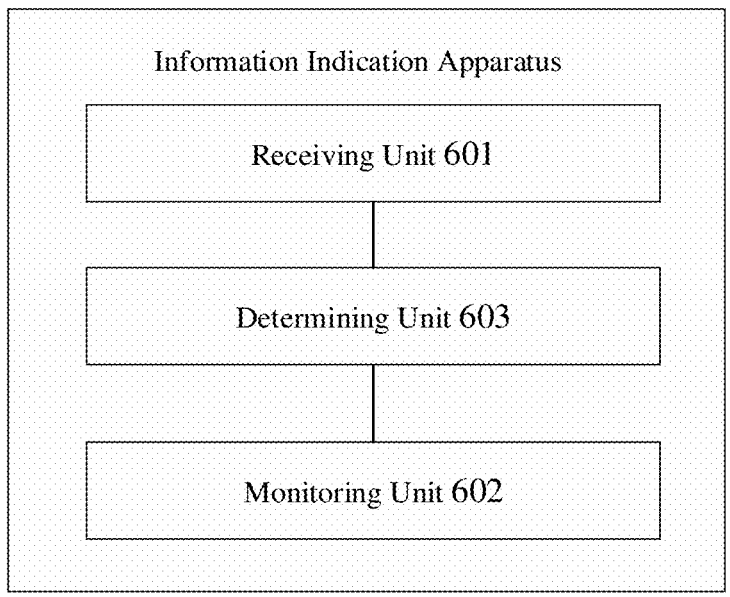
FIG. 6 is a first schematic structural diagram of an information indication apparatus provided by an embodiment of the present disclosure.

FIG. 6 is a first schematic structure diagram of an information indication apparatus provided by an embodiment of the present disclosure. The information indication apparatus is applied to the terminal device. As shown in FIG. 6, the information indication apparatus includes:

a receiving unit 601, configured to receive a first signal associated with a first paging time unit set, where the first signal carries first indication information, and the first indication information is used to indicate whether part or all of paging time units in the first paging time unit set include a paging message; and a monitoring unit 602, configured to monitor for the paging message in one or more target paging time units corresponding to the terminal device and including the paging message in the first paging time unit set, according to the first indication information.

In an optional implementation, the apparatus further includes:

a determining unit 603, configured to determine a second paging time unit set corresponding to the terminal device in the first paging time unit set; and determine one or more target paging time units including the paging message in the second paging time unit set according to the first indication information.

In an optional implementation, the apparatus further includes:

a determining unit 603, configured to determine a third paging time unit set including the paging message in the first paging time unit set according to the first indication information; and determine one or more target paging time units corresponding to the terminal device in the third paging time unit set.

In an optional implementation, the first indication information includes a first bit map, each bit in the first bit map has correspondence with each paging time unit in the first paging time unit set, and a value of the bit is used to indicate whether a paging time unit corresponding to the bit includes a paging message.

In an optional implementation, the paging time unit is a PF or a PO.

In an optional implementation, the first indication information includes a first SFN list and/or a second SFN list;
a paging time unit indicated by a SFN in the first SFN list is a paging time unit including the paging message; and
a paging time unit indicated by a SFN in the second SFN list is a paging time unit not including the paging message.

In an optional implementation, the paging time unit is a PF.

In an optional implementation, when the paging time unit is the PF, the first indication information is used to indicate whether some or all of the PFs in a first PF set include a paging message;
the first signal also carries second indication information, and the second indication information is used to indicate whether some or all of POs in a first PO set contain a paging message, where the first PO set refers to a set of POs included in the PF that contains the paging messages.

In an optional implementation, the monitoring unit 602 is further configured to monitor for the paging messages in one or more target POs corresponding to the terminal device and including the paging message in the first PO set according to the second indication information.

In an optional implementation, the apparatus further includes:
a determining unit 603, configured to determine a second PO set corresponding to the terminal device in the first PO set; and determine one or more target POs including the paging message in the second PO set according to the second indication information.

In an optional implementation, the apparatus further includes:
a determining unit 603, configured to determine a third PO set including the paging message in the first PO set according to the second indication information; and determine one or more target POs corresponding to the terminal device in the third PO set.

In an optional implementation, the second indication information includes a second bit map, each bit in the second bit map has correspondence with each PO in the first PO set, and a value of the bit is used to indicate whether a PO corresponding to this bit contains a paging message.

In an optional implementation, the first signal is a PEI signal or a WUS.

Those skilled in the art should understand that the relevant description of the foregoing information indication apparatus in the embodiments of the present disclosure can be understood with reference to the relevant description of the information indication method in the embodiments of the present disclosure.

Figure 7:
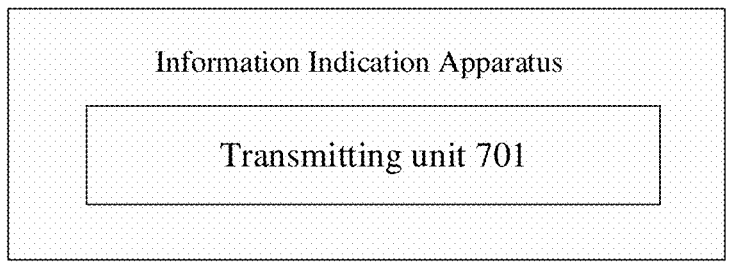
FIG. 7 is a second schematic structural diagram of an information indication apparatus provided by an embodiment of the present disclosure.

FIG. 7 is a second schematic structure diagram of an information indication apparatus provided by an embodiment of the present disclosure. The information indication apparatus is applied to the network device. As shown in FIG. 7, the information indication apparatus includes:
a transmitting unit 701, configured to transmit a first signal associated with a first paging time unit set to a terminal device, where the first signal carries first indication information, and the first indication information is used to indicate whether part or all of paging time units in the first paging time unit set include a paging message,
wherein the first indication information is used for the terminal device to determine one or more target paging time units corresponding to the terminal device and including the paging message in the first paging time unit set.

In an optional implementation, the first indication information includes a first bit map, each bit in the first bit map has correspondence with each paging time unit in the first paging time unit set, and a value of the bit is used to indicate whether a paging time unit corresponding to this bit includes the paging message.

In an optional implementation, the paging time unit is a PF or a PO.

In an optional implementation, the first indication information includes a first SFN list and/or a second SFN list;
a paging time unit indicated by a SFN in the first SFN list is a paging time unit including the paging message; and
a paging time unit indicated by a SFN in the second SFN list is a paging time unit not including the paging message.

In an optional implementation, the paging time unit is a PF.

In an optional implementation, when the paging time unit is the PF, the first indication information is used to indicate whether some or all of PFs in a first PF set include the paging message; and
the first signal also carries second indication information, and the second indication information is used to indicate whether some or all of POs in a first PO set include the paging message, where the first PO set refers to a set of POs included in the PF that includes the paging message.

In an optional implementation, the second indication information is used for the terminal device to determine one or more target POs corresponding to the terminal device and including the paging message in the first PO set.

In an optional implementation, the second indication information includes a second bit map, each bit in the second bit map has correspondence with each PO in the first PO set, and a value of the bit is used to indicate whether a PO corresponding to the bit includes the paging message.

In an optional implementation, the first signal is a PEI signal or a WUS.

Those skilled in the art should understand that the relevant description of the foregoing information indication apparatus in the embodiments of the present disclosure can be understood with reference to the relevant description of the information indication method in the embodiments of the present disclosure.

Figure 8:
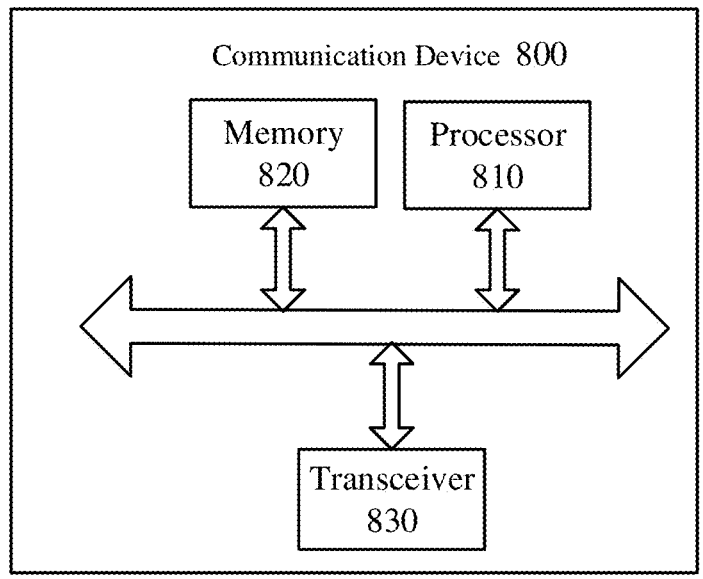
FIG. 8 is a schematic structural diagram of a communication device according to an embodiment of the present disclosure.

FIG. 8 is a schematic structural diagram of a communication device 800 according to an embodiment of the present disclosure. The communication device can be a terminal device or a network device. The communication device 800 shown in FIG. 8 includes a processor 810 which can call and execute a computer program from a memory to carry out the methods in the embodiments of the present disclosure.

Optionally, as shown in FIG. 8, the communication device 800 can further include a memory 820. The processor 810 can call and run the computer program from the memory 820 to carry out the methods in the embodiments of the present disclosure.

The memory 820 can be a separate device independent of the processor 810, or can be integrated in the processor 810.

Optionally, as shown in FIG. 8, the communication device 800 can further include a transceiver 830, and the processor 810 can control the transceiver 830 to communicate with other devices, and specifically to transmit information or data to other devices, or receive information or data transmitted from other devices.

The transceiver 830 can include a transmitter and a receiver. The transceiver 830 can further include an antenna, and the number of the antennas can be one or more.

Optionally, the communication device 800 can specifically be a network device in the embodiments of the present disclosure, and the communication device 800 can carry out the corresponding processes which are implemented by the network device in the methods of the embodiments of the present disclosure, which will not be repeated here for the sake of brevity.

Optionally, the communication device 800 can specifically be a mobile terminal/terminal device in the embodiments of the present disclosure, and the communication device 800 can implement the corresponding processes which are implemented by the mobile terminal/terminal device in the methods according to the embodiments of the present disclosure, which will not be repeated here for the sake of brevity.

Figure 9:
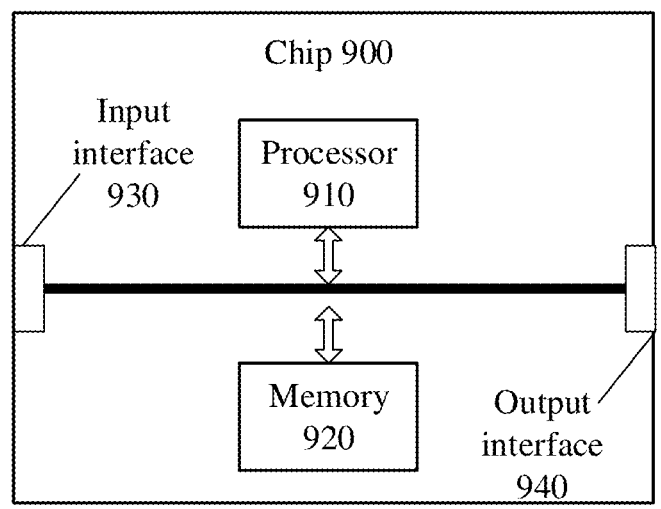
FIG. 9 is a schematic structural diagram of a chip according to an embodiment of the present disclosure.

FIG. 9 is a schematic structural diagram of a chip according to an embodiment of the present disclosure. The chip 900 shown in FIG. 9 includes a processor 910 which can call and run a computer program from a memory to implement the methods in the embodiments of the present disclosure.

Optionally, as shown in FIG. 9, the chip 900 can further include a memory 920. The processor 910 can call and run the computer program from the memory 920 to implement the methods in the embodiments of the present disclosure.

The memory 920 can be a separate device independent of the processor 910, or can be integrated in the processor 910.

Optionally, the chip 900 can further include an input interface 930. The processor 910 can control the input interface 930 to communicate with other devices or chips, and particularly to obtain information or data transmitted by other devices or chips.

Optionally, the chip 900 can further include an output interface 940. The processor 910 can control the output interface 940 to communicate with other devices or chips, and particularly to output information or data to other devices or chips.

Optionally, the chip can be applied to the network device in the embodiments of the present disclosure, and the chip can carry out the corresponding processes which are implemented by the network device in the methods of the embodiments of the present disclosure, which will not be repeated here for the sake of brevity.

Optionally, the chip can be applied to the mobile terminal/terminal device in the embodiments of the present disclosure, and the chip can implement the corresponding processes which are implemented by the mobile terminal/terminal device in the methods of the embodiments of the present disclosure, which will not be repeated here for the sake of brevity.

It should be understood that the chip mentioned in the embodiments of the present disclosure can also be referred to as a system-level chip, a system chip, a chip system, or a system-on-chip.

Figure 10:
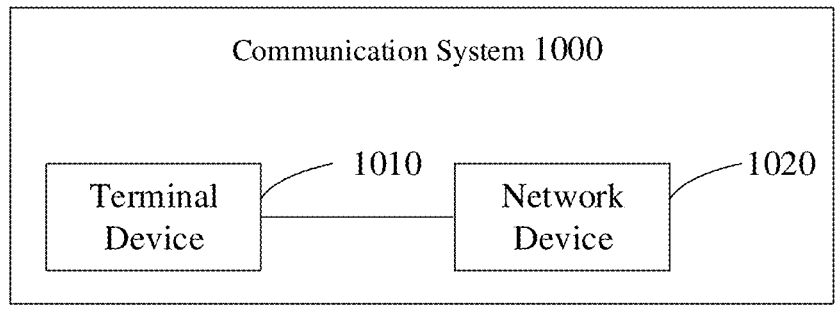
FIG. 10 is a schematic block diagram of a communication system according to an embodiment of the present disclosure.

FIG. 10 is a schematic block diagram of a communication system 1000 according to an embodiment of the present disclosure. As shown in FIG. 10, the communication system 1000 includes a terminal device 1010 and a network device 1020.

The terminal device 1010 can be used to implement the corresponding functions implemented by the terminal device in the above methods, and the network device 1020 can be used to implement the corresponding functions implemented by the network device in the above methods, which will not be repeated here for the sake of brevity.

It should be understood that the processor according to the embodiments of the present disclosure can be an integrated circuit chip with signal processing capability. In the implementations, the steps of the foregoing method embodiments can be completed by an integrated logic circuit of hardware in the processor or by instructions in a form of software. The foregoing processor can be a general-purpose processor, a Digital Signal Processor (DSP), an Application Specific Integrated Circuit (ASIC), a Field Programmable Gate Array (FPGA), other programmable logic devices, discrete gate or transistor logic device, or a discrete hardware component, which can implement the methods, steps, and logical blocks disclosed in the embodiments of the present disclosure. The general-purpose processor can be a microprocessor, any conventional processor or the like. The steps of the methods disclosed in connection with the embodiments of the present disclosure can be directly embodied in and performed by a hardware decoding processor, or can be implemented by a combination of hardware and software modules in the decoding processor. The software modules can be located in a mature storage medium in the art such as a random access memory, a flash memory, a read-only memory, a programmable read-only memory, an electrically erasable programmable memory or a register. The storage medium is located in the memory, and the processor reads information in the memory and implements the steps of the above methods in combination with the hardware thereof.

It can be understood that the memory in the embodiments of the present disclosure may be a volatile memory or a non-volatile memory, or may include both the volatile and non-volatile memories. The non-volatile memory can be a Read-Only Memory (ROM), a Programmable ROM (PROM), an erasable PROM (EPROM), an electrically EPROM (EEPROM) or a flash memory. The volatile memory may be a Random Access Memory (RAM), which is used as an external cache. By way of exemplary but not restrictive description, many forms of RAMs are available, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM)) and a Direct Rambus RAM (DR RAM). It should be noted that the memories of the systems and methods described herein are intended to include, but are not limited to, these and any other suitable types of memories.

It should be understood that the foregoing description of the memory is exemplary rather than limiting. For example, the memory in the embodiments of the present disclosure can also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch-Link DRAM (SLDRAM), a Direct Rambus RAM (DR RAM), among others. That is to say, the memory in the embodiments of the present disclosure is intended to include but is not limited to those and any other suitable types of memories.

An embodiment of the present disclosure also provides a computer-readable storage medium for storing a computer program.

Optionally, the computer-readable storage medium can be applied to the network device in the embodiments of the present disclosure, and the computer program causes a computer to perform the corresponding processes which are implemented by the network device in the methods of the embodiments of the present disclosure, which will not be repeated here for the sake of brevity.

Optionally, the computer-readable storage medium can be applied to the mobile terminal/terminal device in the embodiments of the present disclosure, and the computer program causes a computer to perform the corresponding processes which are implemented by the mobile terminal/terminal device in the methods of the embodiments of the present disclosure, which will not be repeated here for the sake of brevity.

An embodiment of the present disclosure also provides a computer program product including computer program instructions.

Optionally, the computer program product can be applied to the network device in the embodiments of the present disclosure, and the computer program instructions cause a computer to perform the corresponding processes implemented by the network device in the methods according to the embodiments of the present disclosure, which will not be repeated here for the sake of brevity.

Optionally, the computer program product can be applied to the mobile terminal/terminal device in the embodiments of the present disclosure, and the computer program instructions cause a computer to perform the corresponding processes which are implemented by the mobile terminal/terminal device in the methods of the embodiments of the present disclosure, which will not be repeated here for the sake of brevity.

An embodiment of the present disclosure also provides a computer program.

Optionally, the computer program can be applied to the network device in the embodiments of the present disclosure, and when running on a computer, the computer program causes the computer to perform the corresponding process implemented by the network device in the methods according to the embodiments of the present disclosure, which will not be repeated here for the sake of brevity.

Optionally, the computer program can be applied to the mobile terminal/terminal device in the embodiments of the present disclosure, and when running on a computer, the computer program causes the computer to perform the corresponding processes implemented by the mobile terminal/terminal device in the methods of the embodiments of the present disclosure, which will not be repeated here for the sake of brevity.

Those of ordinary skill in the art can recognize that the exemplary units and algorithm steps described in connection with the embodiments disclosed herein can be implemented in electronic hardware or a combination of computer software and the electronic hardware. Whether these functions are implemented in hardware or in software depends on the specific applications of the technical solutions and design constraints. Various methods can be used by professional technicians to implement the described functions for each specific application, and such implementations should not be considered as going beyond the scope of the present disclosure.

Those skilled in the art can clearly understand that for convenience and conciseness of the description, for the specific operating process of the systems, devices and units described above, reference can be made to corresponding processes in the foregoing method embodiments, which will not be repeated here.

It should be understood that the systems, devices, and methods disclosed in several embodiments of the present disclosure can be implemented in other manners. For example, the device embodiments described above are merely illustrative. For example, the division of the units is only a logical function division, and in actual implementations, there can be other division manners. For example, a plurality of units or components can be combined or integrated into another system, or some features can be ignored or not implemented. In addition, the coupling or direct coupling or communication connection shown or discussed herein can also be indirect coupling or communication connection through some interfaces, devices or units, and can be in electrical, mechanical or other forms.

The units described as separate components may be or may not be physically separated, and the components shown as units may be or may not be physical units, that is, they may be located in one place or may be distributed over multiple network units. Some or all of the units can be selected to achieve the objectives of the solutions of the embodiments according to actual requirements.

In addition, the functional units in the embodiments of the present disclosure can be integrated into one processing unit, or each of the units can individually exist physically, or two or more of the units can be integrated into one unit.

If implemented in the form of software functional units and sold or used as an independent product, the functions can be stored in a computer-readable storage medium. Based on such understanding, the technical solution of the present disclosure essentially, a part thereof that contributes to the prior art, or a part of the technical solution can be embodied in the form of a software product, and the computer software product is stored in a storage medium and includes instructions which enable a computer device (which may be a personal computer, a server, a network device or the like) to perform all or part of the steps of the methods described in the embodiments of the present disclosure. The foregoing storage medium includes various medium such as a USB drive, a removable hard disk, a ROM, a RAM, a magnetic disk or an optical disc that can store program codes.

Those described above are only specific implementations of the present disclosure, and the protection scope of the present disclosure is not limited thereto. Any alteration or replacement readily devised by a person skilled in the art within the technical scope disclosed in the present disclosure shall fall within the scope of the present disclosure. Therefore, the protection scope of the present disclosure shall be subject to the protection scope of the claims.

What is claimed is:

1. An information indication method, the method comprising:

receiving, by a terminal device, a first signal associated with a first paging time unit set, wherein the first signal carries first indication information, and the first indication information is used to indicate whether part or all of paging time units in the first paging time unit set comprise a paging message, the first signal is a Paging Early Indication (PEI) signal, and the paging time unit is a Paging Frame (PF); and monitoring for the paging message by the terminal device in one or more target paging time units corresponding to the terminal device and comprising the paging message in the first paging time unit set, according to the first indication information.

2. The method according to claim 1, further comprising:
determining, by the terminal device, a second paging time unit set corresponding to the terminal device in the first paging time unit set; and
determining, by the terminal device according to the first indication information, the one or more target paging time units comprising the paging message in the second paging time unit set.

3. The method according to claim 1, further comprising:
determining, by the terminal device according to the first indication information, a third paging time unit set comprising the paging message in the first paging time unit set; and
determining, by the terminal device, the one or more target paging time units corresponding to the terminal device in the third paging time unit set.

4. The method according to claim 1, wherein the first indication information comprises a first bit map, each bit in the first bit map has correspondence with each paging time unit in the first paging time unit set, and a value of the bit is used to indicate whether a paging time unit corresponding to the bit comprises the paging message.

5. The method according to claim 1, wherein the first indication information comprises a first SFN list and/or a second SFN list;
a paging time unit indicated by a SFN in the first SFN list is a paging time unit comprising the paging message; and
a paging time unit indicated by a SFN in the second SFN list is a paging time unit not comprising the paging message.

6. The method according to claim 1, wherein the first indication information is used to indicate whether part or all of PFs in a first PF set comprise the paging information, and
the first signal further carries second indication information, and the second indication information is used to indicate whether some or all of POs in a first PO set comprise the paging message, wherein the first PO set refers to a set of POs comprised in the PF that comprises the paging message.

7. An information indication method, the method comprising:
transmitting, by a network device, a first signal associated with a first paging time unit set to a terminal device, wherein the first signal carries first indication information, and the first indication information is used to indicate whether part or all of paging time units in the first paging time unit set comprise a paging message, the first signal is a Paging Early Indication PEI) signal, and the paging time unit is a Paging Frame (PF),
wherein the first indication information is used for the terminal device to determine one or more target paging time units corresponding to the terminal device and comprising the paging message in the first paging time unit set.

8. The method according to claim 7, wherein the first indication information comprises a first bit map, each bit in the first bit map has correspondence with each paging time unit in the first paging time unit set, and a value of the bit is used to indicate whether a paging time unit corresponding to the bit comprises the paging message.

9. A network device comprising a processor and a memory for storing a computer program, wherein the processor is configured to call and run the computer program stored in the memory to perform the method according to claim 7.

10. A terminal device, comprising:
a transceiver;
a processor; and
a memory for storing a computer program,
wherein the transceiver is configured to receive a first signal associated with a first paging time unit set, wherein the first signal carries first indication information, and the first indication information is used to indicate whether part or all of paging time units in the first paging time unit set comprise a paging message, the first signal is a Paging Early Indication (PEI) signal, and the paging time unit is a Paging Frame (PF); and
the processor is configured to monitor for the paging message in one or more target paging time units corresponding to the terminal device and comprising the paging message in the first paging time unit set, according to the first indication information.

11. The terminal device according to claim 10, wherein the processor is further configured to determine a second paging time unit set corresponding to the terminal device in the first paging time unit set; and determine one or more target paging time units comprising the paging message in the second paging time unit set according to the first indication information.

12. The terminal device according to claim 10, wherein the processor is further configured to determine a third paging time unit set comprising the paging message in the first paging time unit set according to the first indication information; and determine the one or more target paging time units corresponding to the terminal device in the third paging time unit set.

13. The terminal device according to claim 10, wherein the first indication information comprises a first bit map, each bit in the first bit map has correspondence with each paging time unit in the first paging time unit set, and a value of the bit is used to indicate whether a paging time unit corresponding to the bit comprises the paging message.

* * * * *